United States Patent
Kang

(10) Patent No.: US 9,621,812 B2
(45) Date of Patent: Apr. 11, 2017

(54) IMAGE CAPTURING CONTROL APPARATUS AND METHOD

(71) Applicant: Samsung Electronics Co., Ltd., Gyeonggi-do (KR)

(72) Inventor: Jiyoung Kang, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 631 days.

(21) Appl. No.: 14/086,644

(22) Filed: Nov. 21, 2013

(65) Prior Publication Data
US 2014/0139667 A1    May 22, 2014

(30) Foreign Application Priority Data

Nov. 22, 2012 (KR) .................. 10-2012-0132737

(51) Int. Cl.
*G08B 13/196* (2006.01)
*H04N 5/232* (2006.01)

(52) U.S. Cl.
CPC ..... *H04N 5/23296* (2013.01); *H04N 5/23219* (2013.01)

(58) Field of Classification Search
CPC .................... H04N 5/23296; H04N 5/23219
USPC ........................................................ 348/143
See application file for complete search history.

(56) References Cited

U.S. PATENT DOCUMENTS

| | | | | |
|---|---|---|---|---|
| 5,485,239 A * | 1/1996 | Ohsawa | ................. | G02B 7/346 396/51 |
| 2004/0233296 A1* | 11/2004 | Sugimoto | .......... | G06K 9/00228 348/222.1 |
| 2005/0122401 A1* | 6/2005 | Horie | ................. | H04N 5/23293 348/207.99 |
| 2006/0077264 A1* | 4/2006 | Ikeda | ..................... | H04N 5/232 348/222.1 |
| 2008/0080846 A1* | 4/2008 | Grip | ....................... | G02B 7/287 396/51 |
| 2008/0240698 A1* | 10/2008 | Bartilson | ............... | G03B 13/12 396/78 |
| 2009/0135291 A1* | 5/2009 | Sugimoto | .......... | H04N 5/23212 348/347 |
| 2009/0225184 A1* | 9/2009 | Sugino | ................... | H04N 5/232 348/222.1 |
| 2009/0295832 A1* | 12/2009 | Takatsuka | ................. | G06T 3/40 345/659 |
| 2011/0050976 A1* | 3/2011 | Kwon | ................ | H04N 5/23293 348/333.04 |
| 2011/0058051 A1* | 3/2011 | Jeon | ....................... | G06F 3/012 348/211.11 |

(Continued)

FOREIGN PATENT DOCUMENTS

JP    2012090029    5/2012

*Primary Examiner* — Christopher S Kelley
*Assistant Examiner* — Deirdre Beasley
(74) *Attorney, Agent, or Firm* — The Farrell Law Firm, P.C.

(57) ABSTRACT

Methods and apparatus for image capturing are provided. A first camera mounted on a rear side of a mobile terminal, and a second camera mounted on a front side of a mobile terminal, are driven in an image capturing mode. A user's face is detected in a second image generated by the second camera. An alarm is generated that indicates that a first image is out of an intended image capturing area, when the user's face is not detected in the second image and when a difference is detected between the first image and a reference first image.

16 Claims, 9 Drawing Sheets

(56) References Cited

U.S. PATENT DOCUMENTS

| | | | |
|---|---|---|---|
| 2011/0234826 A1* | 9/2011 | Nguyen | G03B 5/00 348/208.6 |
| 2013/0155309 A1* | 6/2013 | Hill | H04N 5/23212 348/333.11 |
| 2013/0222638 A1* | 8/2013 | Wheeler | G06F 3/013 348/231.2 |
| 2013/0258089 A1* | 10/2013 | Lyons | H04N 5/23212 348/77 |
| 2014/0049667 A1* | 2/2014 | Robinson | H04N 5/23293 348/262 |
| 2014/0184854 A1* | 7/2014 | Musatenko | H04N 5/23296 348/240.2 |
| 2014/0361986 A1* | 12/2014 | Won | H04N 1/00307 345/156 |

* cited by examiner

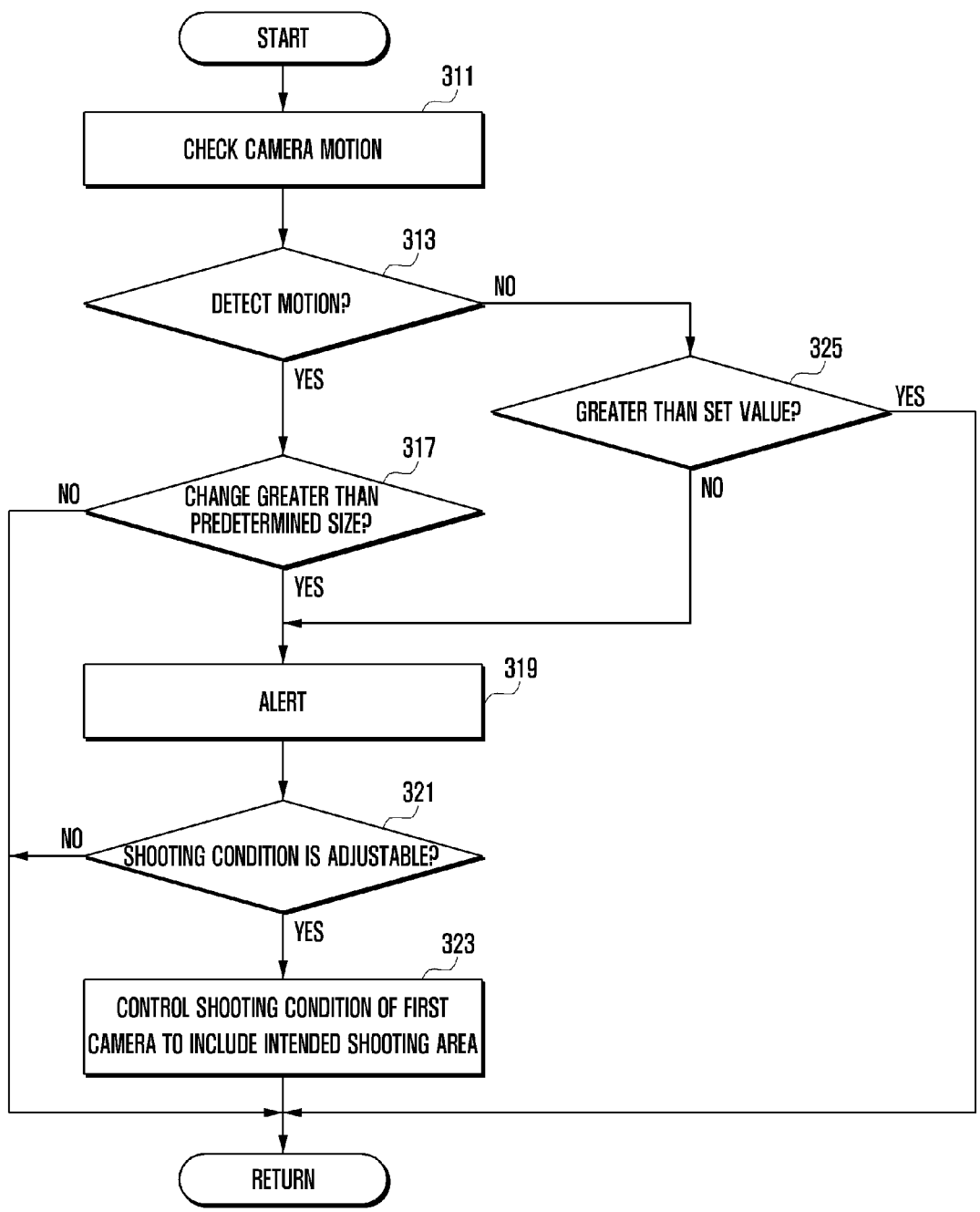

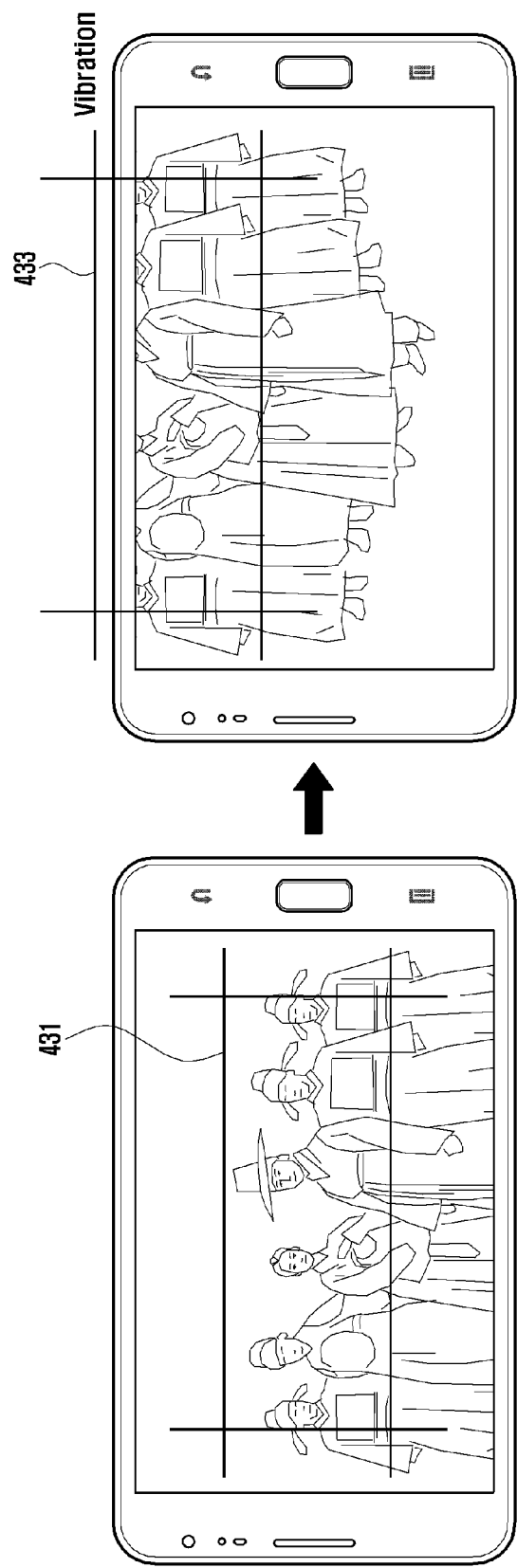

IMAGE CAPTURING CONTROL APPARATUS AND METHOD

PRIORITY

This application claims priority under 35 U.S.C. §119(a) to a Korean patent application filed on Nov. 22, 2012 in the Korean Intellectual Property Office and assigned Serial No. 10-2012-0132737, the entire disclosure of which is incorporated herein by reference.

BACKGROUND OF THE INVENTION

1. Field of the Invention

The present invention relates generally to an image capture control apparatus and method of a mobile terminal and, more particularly, to an image capture control apparatus and method of a dual camera-enabled mobile terminal.

2. Description of the Related Art

Mobile terminals may feature a dual camera, in which one camera is on a front side of the mobile terminal and the other camera is on a rear side of the mobile terminal. A user of the mobile terminal is capable of capturing an image using one of the front and rear cameras while viewing the corresponding scene on a display screen of the mobile terminal. In a motion image capture mode, the user is required to monitor a viewfinder or the display screen, which is displaying a captured scene, to acquire a desired video result. Accordingly, when recording a video, the user is required to control the motion image capture process while also monitoring the target to avoid losing focus on the target view. If the user's attention is distracted from the viewer finder or display screen, the focusing point is likely to change, resulting in an undesirable video result.

Also, when capturing a scene with the rear camera, the user is required to manipulate a button or lens to adjust the zoom condition.

SUMMARY OF THE INVENTION

The present invention has been made to address at least the above problems and/or disadvantages and to provide at least the advantages described below. Accordingly, an aspect of the present invention provides an image capturing control apparatus and method that is capable of controlling a rear camera of a dual camera-enabled mobile terminal to acquire desired image or video.

Another aspect of the present invention provides an image capturing control apparatus and method of a dual camera-enabled mobile terminal that is capable of monitoring a user's image capturing state with the front camera, and analyzing the image taken by the rear camera to warn the user and/or adjust the zoom condition when the user's image capturing state changes.

Another aspect of the present invention provides an image capturing control apparatus and method of a dual camera-enabled mobile terminal that is capable of monitoring the user's image capturing state with the front camera, and adjusting the zoom condition of the rear camera according to the change of the user's image capturing state.

In accordance with an aspect of the present invention, an image capturing apparatus is provided. The apparatus includes a first camera mounted on a rear side of the apparatus for capturing a first image. The apparatus also includes a second camera mounted on a front side of the apparatus for capturing a second image. Additionally, the apparatus includes a display unit that displays the first image. The apparatus further includes a control unit that drives the first camera and the second camera in an image capturing mode, and generates an alarm indicating that the first image is out of an intended image capturing area when a user's face is not detected in the second image and when a difference is detected between the first image and a reference first image.

In accordance with another aspect of the present invention, an image capturing control method of a mobile terminal is provided. A first camera mounted on a rear side of the mobile terminal, and a second camera mounted on a front side of the mobile terminal, are driven in an image capturing mode. A user's face is detected in a second image generated by the second camera. An alarm is generated that indicates that a first image is out of an intended image capturing area, when the user's face is not detected in the second image and when a difference is detected between the first image and a reference first image.

BRIEF DESCRIPTION OF THE DRAWINGS

The above and other aspects, features, and advantages of the present invention will be more apparent from the following detailed description when taken in conjunction with the accompanying drawings, in which:

FIG. 3 is a flowchart illustrating a rear camera image capturing control procedure when the face recognition fails in FIG. 2, according to an embodiment of the present invention;

FIGS. 4A through 4C are diagrams illustrating a camera image capturing through the procedures of FIGS. 2 and 3, according to an embodiment of the present invention;

DETAILED DESCRIPTION OF EMBODIMENTS OF THE PRESENT INVENTION

Figure 1:
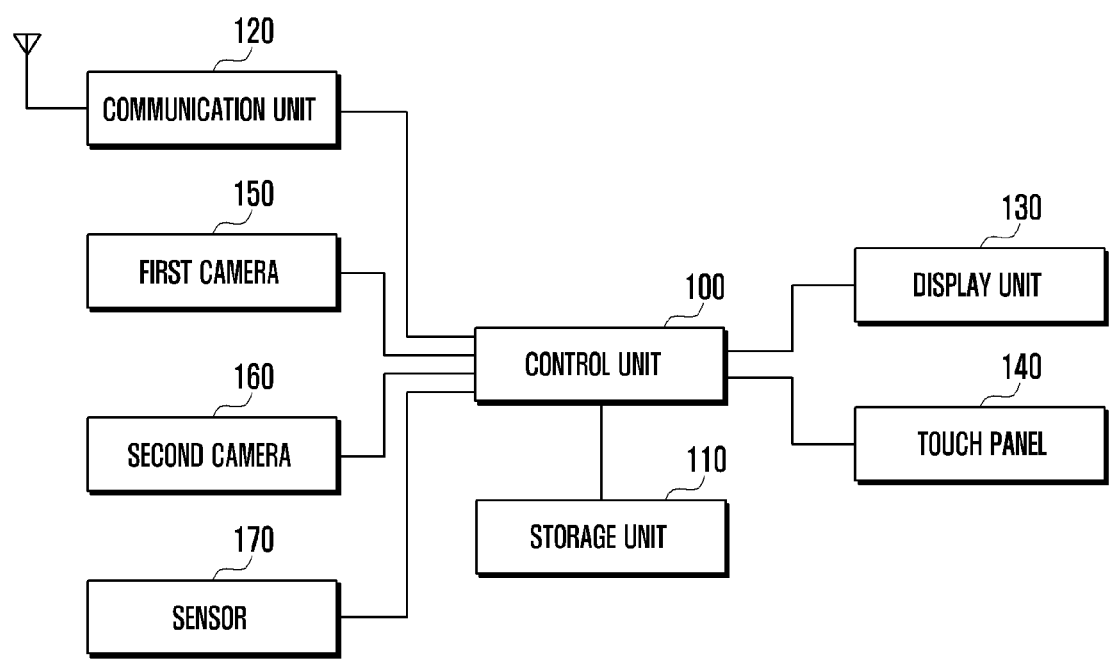
FIG. 1 is a block diagram illustrating a configuration of the mobile terminal, according to an embodiment of the present invention.

Embodiments of the present invention are described in detail with reference to the accompanying drawings. The same or similar components may be designated by the same or similar reference numerals although they are illustrated in different drawings.

Embodiments of the present invention relate to an image capturing control apparatus and method of a mobile terminal, equipped with a front camera and a rear camera, that is capable of using the front and rear cameras simultaneously in capturing a video, improving the usability of the mobile terminal.

A portable terminal, according to an embodiment of the present invention, checks a user state by analyzing an image input through the front camera to determine whether to change an image capturing condition. If the user state changes, the portable terminal analyzes the image taken by the rear camera to provide a warning when the image taken by the rear camera shows an unintended result. The user's image capturing state may be checked through a face detection function with the front camera, which is capable of determining whether the user maintains eye contact with the display unit or viewfinder. Specifically, if the user's attention is distracted from the viewfinder or display unit and drawn to the physical scene, the captured image may unintentionally change due to the user's movement.

According to an embodiment of the present invention, when the user's image capturing state changes, the mobile terminal analyzes the image taken by the rear camera. If an unintended image has been taken, the mobile terminal provides an indication or alarm that this has occurred, and, if possible, adjusts the image capturing condition. For example, if it is determined that the user is in the state of staring at the physical scene (object), and not the viewfinder or display screen, the mobile terminal compares the previously captured image from the rear camera and the currently captured image from the rear camera. If the difference between the two images is greater than a predetermined value, the mobile terminal automatically provides an indication, a warning, or an alarm of the user's distraction. This alarm makes it known to the user that an incorrect scene is being captured due to the user's distraction. If it is possible to correct the image capturing condition (e.g., a correction of a zoom condition), the mobile terminal automatically adjusts the zoom condition to capture the intended scene, while also providing a warning of the current situation.

According to an embodiment of the present invention, the user terminal can analyze the image taken by the front camera to check the distance between the user and the terminal, and adjust the zoom condition of the rear camera according to the checked distance. For example, the mobile terminal is capable of recognizing the face of the user with the front camera while capturing a scene with the rear camera. If there is any change in the user's face due to the change of distance between the camera and the user, the mobile terminal is capable of automatically adjusting the zoom condition of the rear camera according to the changed distance. The face recognition can be accomplished by detecting changes in the eyes, nose, and/or mouth of the user. The mobile terminal may be provided with sensors for detecting the movement of the device. If movement of the camera is detected while the camera is operating, the mobile terminal may detect a change in the distance according to a difference from a previous state. The movement detection may be accomplished using the user's face recognition with the front camera and the movement distance detected by the sensors. Accordingly, the mobile terminal is capable of automatically executing zoom-in and zoom-out operations according to the distance between the mobile terminal and the user.

FIG. 1 is a block diagram illustrating a configuration of the mobile terminal, according to an embodiment of the present invention. The mobile terminal may be embodied as any type of digital device including, for example, a cellular phone, such as a smartphone, an MP3 player, a tablet computer, a camera device, etc.

Referring to FIG. 1, a communication unit 120 is responsible for radio communication with a base station or another terminal. The communication unit 120 may include a transmitter for up-converting and amplifying the transmission signal, and a receiver for low noise amplifying and down-converting the received signal. The communication unit 120 may include a modulator and a demodulator. The modulator modulates the transmission signal and sends the modulated signal to the transmitter, and the demodulator demodulates the signal received by the receiver. The modulator/demodulator can be configured to process the signal of any of Long Term Evolution (LTE), Wideband Code Division Multiple Access (WCDMA), Global System for Mobile communications (GSM), Wireless-Fidelity (Wi-Fi), Wireless Broadband (WiBro), Near Field Communication (NFC), Bluetooth, etc. In an embodiment of the present invention, it is assumed that the communication unit 120 includes LTE, Wi-Fi, and Bluetooth communication modules.

A first camera 150 is a rear camera mounted on a rear side of the mobile terminal, and capable of capturing a high solution image. A second camera 160 is a front camera mounted on a front side of the mobile terminal, and capable of capturing a relatively low resolution image as compared to the first camera 150.

A control unit 100 controls overall operations of the mobile terminal, simultaneously drives the first and second cameras 150 and 160 in an image capturing mode, according to an embodiment of the present invention, and controls the image capturing operations of the first camera based on the user's face recognition with the second camera 160.

A storage unit 110 includes a program memory for storing an Operation System (OS) of the terminal and programs related to the operations, according to the embodiment of the present invention. The storage unit 110 also includes a data memory for storing tables related to the operation of the terminal and data generated in the mobile terminal.

A display unit 130 displays the information on the application that is currently running under the control of the control unit 100. The display unit 130 may be implemented using one of a Liquid Crystal Display (LCD) and an Organic Light Emitting Display (OLED). An input unit 140 may be implemented as a capacitive type or a resistive type panel, which can generate location information for the control unit 100 in response to a user's touch gesture (hereinafter, assumed as finger touch). The input unit 140 may further include an Electro-Magnetic Resonance (EMR) sensor pad to detect a pen touch input and generate corresponding signal to the control unit 100. The display unit 130 and the input unit 140 may be integrated into a single unit.

A sensor unit 170 includes sensors for detecting motion of the mobile terminal. The control unit 100 analyzes the output of the sensor unit 170 to acquire the distance between the terminal and the user. The sensors may include an acceleration sensor, an electromagnetic sensor, and/or a position detection sensor.

The mobile terminal of FIG. 1, according to an embodiment of the present invention, is provided with the rear camera 150 for taking a photo or video, and the front camera 160 capable of recognizing user's eyes and gaze direction. The control unit 100 determines whether the user is staring at the viewfinder by means the front camera while the rear camera 150 records video. The control unit 100 analyzes the image input through the front camera 160 to determine a user situation by recognizing the user's face and/or detecting change in the user's eyes, the user's gazing direction, and the distance between the camera and the user. The control unit 100 controls the image input through the rear camera 150 or generates a signal notifying the user of the recognized situation.

As described above, in an image capturing mode, the control unit 100 drives the front camera 160 and the rear camera 150 simultaneously. When the rear camera 150 captures a scene in front of the user, the control unit 100 recognizes the face of the user and optimizes the image capturing environment based on the recognition result so as to take better image with the rear camera 150.

In a motion image capturing shooting operation, when the rear camera 150 captures a video, the control unit recognizes and tracks the user's eyes (through face orientation) in the image input through the front camera 160, to determine whether the user is staring at the viewfinder. If it is determined that the rear camera 150 is capturing the scene without change in height and posture, the control unit 100 measures and analyzes the height of the image being shot and an area (or a terminal's height and angle), and stores (or records) the analysis result. The control unit 100 analyzes the output detection of the sensor 170 and/or the image taken by the front camera 160 to configure the height and area of the video.

When the video being shot by the rear camera 150 is maintained (i.e., the height and direction of the terminal is fixed without change), the control unit 100 tracks the image input through the front camera 160 to determine whether the user's eyes are distracted. If it is determined that the image input through the front camera 160 and/or the height (horizontal and vertical movement, user's terminal hold angle, etc.) are fixed, the control unit 100 determines that the terminal is fixed.

If a user's face is not detected in the image input through the front camera 160 or the user's eyes are changed, the control unit 100 detects the video being shot by the rear camera 150 and/or the output of the sensor 170 to control the image capturing operation of the rear camera 150. If the height, direction (vertical and/or horizontal direction), and angle of the video being shot by the rear camera 150 is changed as compared to the previously recorded measurement value (e.g., the height of the terminal has changed over M cm), the control unit 100 generates a signal alerting the user (such as a vibration, a sound, a flash, etc.) such that the user adjusts the focus of the camera as intended. When an alert occurs while capturing a video, if it is possible to continue capturing the intended scene by changing the image capturing condition, the control unit 100 adjusts the image capturing condition to capture the correct video. For example, if the height of the video being shot is changed in the zoom-in state, the control unit 100 automatically zooms out to prevent the image from being cut off unintentionally and alerts the user of the situation.

The sensor 170 for sensing the motion of the terminal may include, for example, an altitude sensor, a gyro sensor, and an acceleration sensor. When sensing the height movement, the control unit 100 may use various technologies of measuring a real height with the altitude sensor, or measuring a relative height compared to a current height set to 0.

Figure 2:
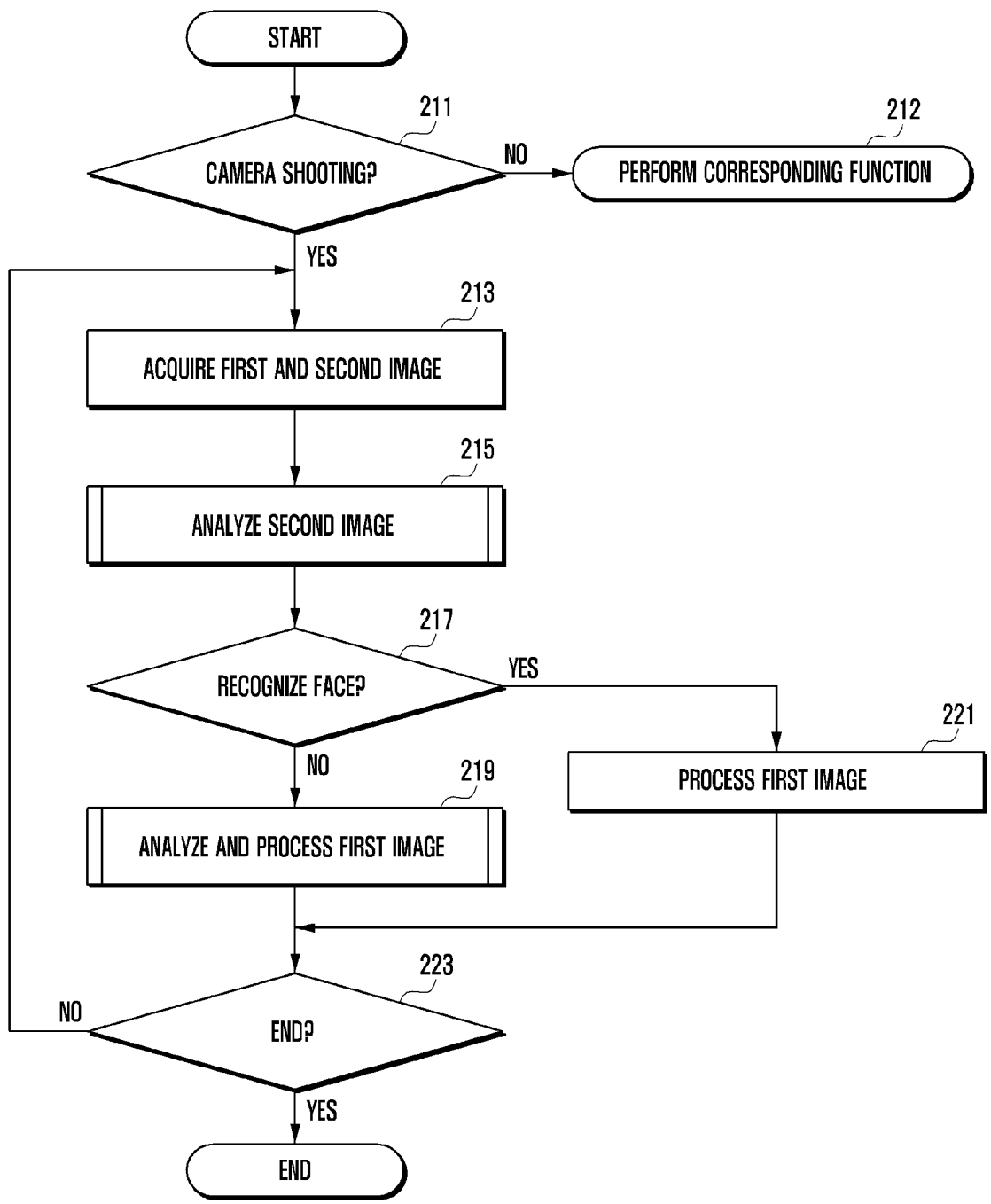
FIG. 2 is a flowchart illustrating an image capturing control method of the mobile terminal, according to an embodiment of the present invention.

FIG. 2 is a flowchart illustrating an image capturing control method of the mobile terminal, according to an embodiment of the present invention.

Referring to FIG. 2, if a camera driving signal is input through the input unit 140, the control unit 100 drives first and second cameras 150 and 160, processes the image input through the first camera 150 to display the processed image on the screen of the display unit 130, and analyzes the image input through the second camera 160. The camera operation can be still image capturing, motion image capturing, or preview image capturing. For this embodiment of the present invention, it is assumed that the camera operation is motion image capturing.

The control unit determines whether the camera is in an image capturing state, in step 211. When the camera is not in the image or video capturing state, a corresponding function is performed, in step 212. When the camera is in the image or video capturing state, the control unit acquires first and second images from the first and second cameras 150 and 160, in step 213. The first camera 150 is the rear camera mounted on the rear side of the terminal for capturing a scene within a specific range (a zoom condition) of the terminal. In the motion image capturing mode, the control unit 100 processes the first images input sequentially as viewing images displayed on the screen of the display unit 130, and compressively encodes the images for storage in the storage unit 110. In the still image capturing mode, the control unit 100 processes the first images input sequentially as viewing images displayed on the screen of the display unit 130, and compressively encodes the images for storage in the storage unit 110. In the preview mode, the control unit 100 processes the first images input sequentially as the viewing image displayed on the screen of the display unit 130.

The control unit 100 analyzes the image being captured by the second camera 160, in step 215. In step 217, the control unit determines whether a face is recognized. In the image capturing mode, the user sets the image capturing area of the first camera 150 by changing the position of the terminal while checking the first image displayed on the screen of the display unit 130. The second camera 160, mounted on the front side of the terminal, captures the face image of the user facing the screen of the display unit 130. Accordingly, the control unit 100 recognizes the image (i.e., the user's face) taken by the second camera 160 to determine whether the user is staring at the display unit 130.

Face recognition may be performed in two steps. First, the face layout is extracted to identify the face in the entire image. Second, the face is recognized to identify the user. The face layout process uses the information such as, for example, brightness, motion, color, and eye position estimation to distinguish the face from the background. In order to extract the face layout exactly, two or more pieces of information may be used complementary. In an embodiment of the present invention, the face recognition function can be implemented with the face layout extraction. The control unit 100 is provided with the face recognition function, with which it is possible to identify the user's nose, eyes, mouth, and face line. Particularly, the control unit 100 detects the eye orientation to determine whether the user is staring at the display unit 130. If the user's face is extracted in the second image, the control unit 100 analyzes the face recognition and determines whether the user's eyes (e.g., the positions of the user's pupils) are oriented to the screen of the display unit 130.

If the face is recognized in step 217, the control unit 100 processes the first image of the first camera 150, in step 221. The control unit 100 buffers the first image as a reference image. Specifically, when the user's face is not recognized in a subsequent step, an image being captured with the first camera 150 is compared with a buffered image to determine whether an intended image is being captured. More specifically, the buffered image can be a reference image of the user's intended image capturing area.

When capturing an image, the user may view the object directly instead of through display unit 130 or viewfinder. For example, the user may stare at the physical object being shot in the image capturing mode and the user's face may be out of the image capturing area of the second camera 160, or the user's eye orientation may be directed away from the display unit 130 or the viewfinder. Accordingly, the control unit 100 may fail to detect the face of the user in the second image or may determine that the eye orientation of the user is directed away from the display area. In this case, the user may unintentionally capture an image from an area different from the user intended image capturing area due to motion of the user's arm or body. Accordingly, if it is determined that the user's face is not recognized at step 217, the control unit 100 analyzes and processes the image taken by the first camera 150, in step 219. The control unit 100 compares the reference image and the image shot by the first camera 150 to analyze the image capturing areas of the two images. If the difference between image capturing areas of the two images is greater than a predetermined value, the control unit 100 generates an alert that the image is out of the image capturing area, in step 219. The image includes a person and if the person's face is detected, it is determined that the image is taken in the image capturing area. The alert can be generated in the form of audio, vibration, and/or lighting. If it is possible to continue image capturing in the image capturing area of the reference image by changing the zoom condition when the alert is generated, the control unit 100 may continue image capturing by adjusting the zoom condition while continuing to generate an alert or not, in step 219.

In step 223, it is determined whether the user ends the image capturing operation. When the user ends the image capture operation, the control unit 100 turns off the first and second cameras 150 and 160. If the user does not end the image capturing operation, the methodology returns to step 213.

Figure 4A:
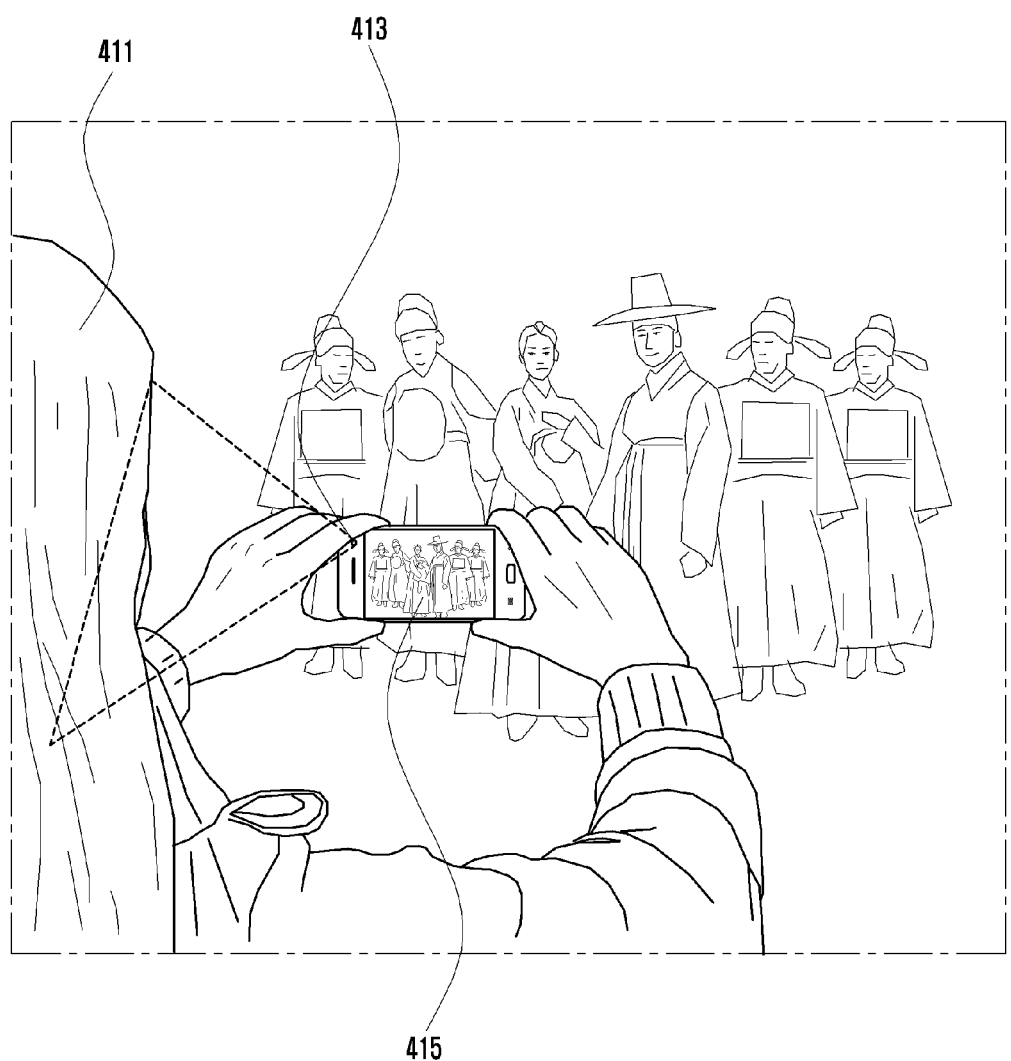
Figure 4C:
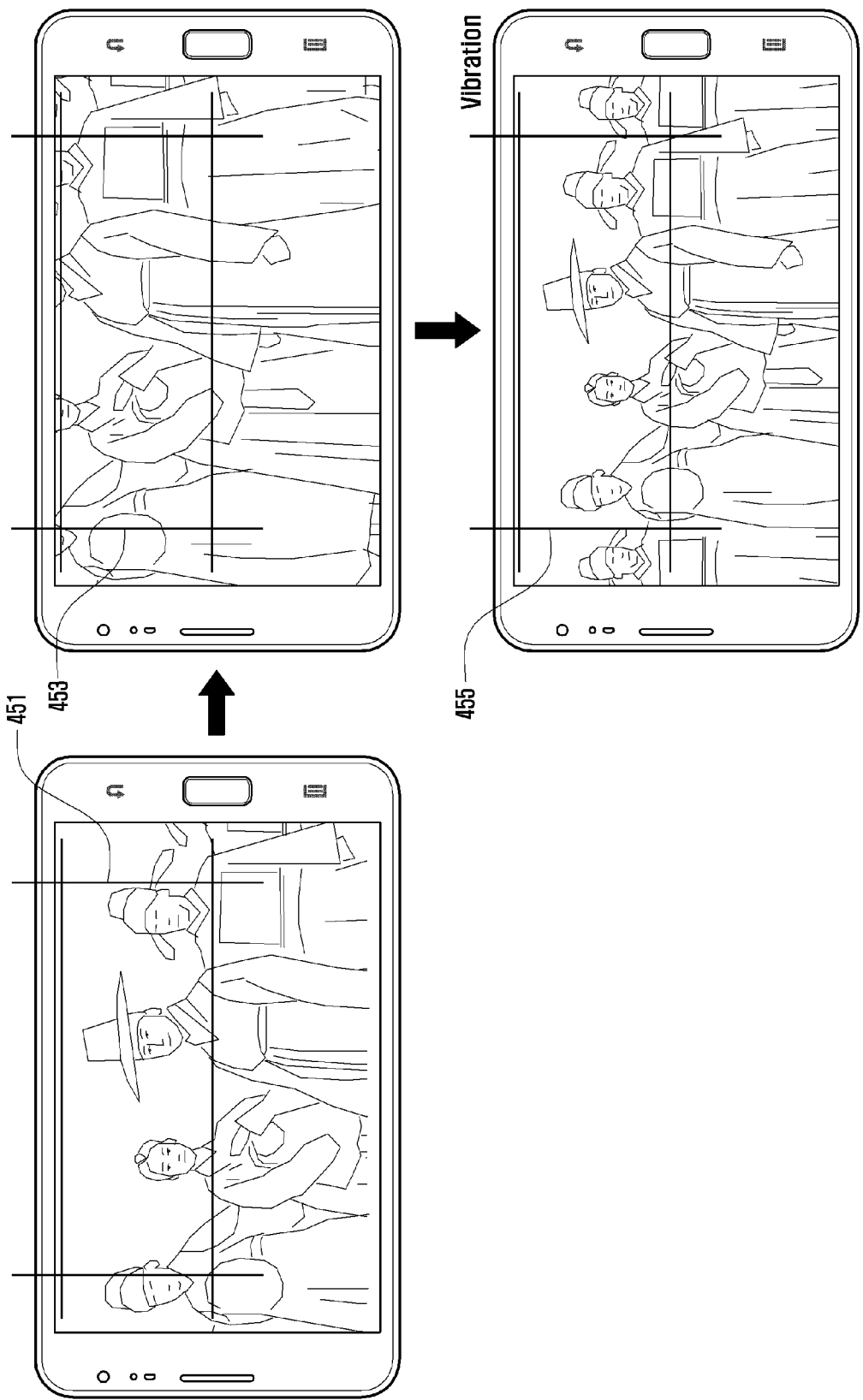

FIG. 3 is a flowchart illustrating a rear camera image capturing control procedure when the face recognition fails in FIG. 2, according to an embodiment of the present invention. FIGS. 4A through 4C are diagrams illustrating camera image capturing through the procedures of FIGS. 2 and 3, according to an embodiment of the present invention.

Referring to FIGS. 3 and 4A to 4C, when taking a photo of a scene as shown in FIG. 4A, a user 411 takes the photo while checking an image displayed on a screen 415. The control unit 100 detects that the terminal is capturing a scene, in step 211 of FIG. 2. The terminal includes a front camera 413. The control unit 100 acquires and processes the images taken by the first and second cameras and analyzes the second image. If the user's face is detected in the second image, or if the eyes of the detected face are oriented to the screen 415, the control unit 100 processes the first image being shot by the first camera 150, in step 221. When processing the first image, if it is determined that the first image is being shot at a fixed height in a fixed posture over a predetermined time (N sec). The control unit 100 measures and analyzes the height of the and area of the image being shot (or height and angle of the terminal) and stores (or buffers) the analysis result in the storage unit 110. The stored information is maintained if no user movement is detected in subsequent steps. The first image, processed at step 221, has an image capturing area denoted by reference number 431 in FIG. 4B.

If a change is detected in the second image being shot by the second camera 160 in the above state, the control unit 100 performs the operation of FIG. 3. The movement of the user is determined according to the analysis result of the second image being shot by the front camera 160. It may be determined that no user's face is detected or that the eyes of the user are not oriented to the screen 415. The control unit 100 may further store the position value of the pupils oriented toward the screen 415 when processing the first image, in step 221 and analyze the positions of the user's pupils in analyzing the second image, in step 215.

If the user's face is not recognized, the control unit 100 checks for movement of the mobile terminal, in step 311. The movement can be checked by analyzing the output of the sensor 170. The movement can be determined through a comparison analysis between the position information of the mobile terminal set in processing the first image, in step 221 (vertical and horizontal position of the terminal, user's terminal hold angle, etc.) and the position information of the terminal currently detected by the sensor 170. In step 313, the control unit 100 determines whether motion is detected. If movement is detected, the control unit 100 determines whether the movement is greater than a predetermined size, in step 317. If the movement is less than or equal to the predetermined size, the control unit 100 determines that the terminal fixed and the procedure returns to FIG. 2. If the movement is greater than the predetermined size based on the orientation (vertical and/or horizontal orientations) and angle of the image being captured by the rear camera 150, the control unit 100 generates an alert that the image from the rear camera 150 is out of the intended image capturing area, in step 319.

Specifically, if the image capturing area is set as shown by reference number 431 in FIG. 4B, and if no user's face is recognized from the image being captured by the second camera 160, the control unit 100 analyzes the movement of the terminal. The user may be capturing the scene without paying attention to the screen and, in this case, the horizontal and/or vertical direction of the mobile terminal may change due to movement of the user, changing an image capturing angle. The first image being shot by the first camera 150 is shaken, such that the image capturing area of the first camera 150 is changed as denoted by reference number 433 in FIG. 4B.

Terminal movement detection can be performed using the first image. The control unit 100 stores the first image, in step 221 of FIG. 2, and, if camera movement is detected, in step 311 of FIG. 3, the stored first image (i.e., reference image) is compared to the first image currently being captured to determine movement. If the difference between the two images is greater than a predetermined size, the control unit 100 detects this at step 317 and generates an alert at step 319. Particularly, if the first image includes a person, the control unit 100 extracts the person's face from the first image and determines whether the face is detected normally to determine whether the camera is shaken. If the person's face is not extracted normally from the first image, the control unit 100 determines that the change in the first image is greater than the predetermined size in step 317, and generates an alert in step 319.

When generating an alert, it is determined whether an image capturing condition is adjustable, in step 321. The control unit 100 may continue capturing the first image while changing the image capturing condition of the first camera 150. Specifically, the first camera 150 may change in zoom according to the user's selection. The image capturing condition may be considered adjustable when the zoom condition is not at the maximum zoom-in or zoom-out of view of the first camera 150.

For example, if any movement of the mobile terminal is detected while being in a zoom-in image capturing area, as denoted by reference numbers 451 and 453 of FIG. 4C, the control unit 100 is capable of changing the image capturing condition to zoom-out to detect the scene of the intended image capturing area as shown by reference number 455 of FIG. 4C, and in step 323 of FIG. 3.

In an embodiment of the present invention, it is possible to automatically adjust the image capturing condition of the first camera 150 according to the movement of the camera as intended by the user. In another embodiment of the present invention, the control unit 100 is capable of analyzing the distance between the user and the terminal using the first camera 160, and adjusting the image capturing condition (e.g. controlling zoom control) of the rear camera 150 according to the predefined condition. For example, the control unit 100 is capable of analyzing the user's eye orientation and distance from the terminal in the image being shot by the front camera 160 and then controlling zoom-in/out of the rear camera 160 according to the analysis. If the user's eye orientation moves closer to the terminal (if the user's eyes, nose, and mouth are recognized as increasing in size), the control unit 100 controls the first camera 150 to zoom in. If the user's eye orientation moves further from the terminal, the control unit 100 controls the first camera 150 to zoom out.

Figure 5:
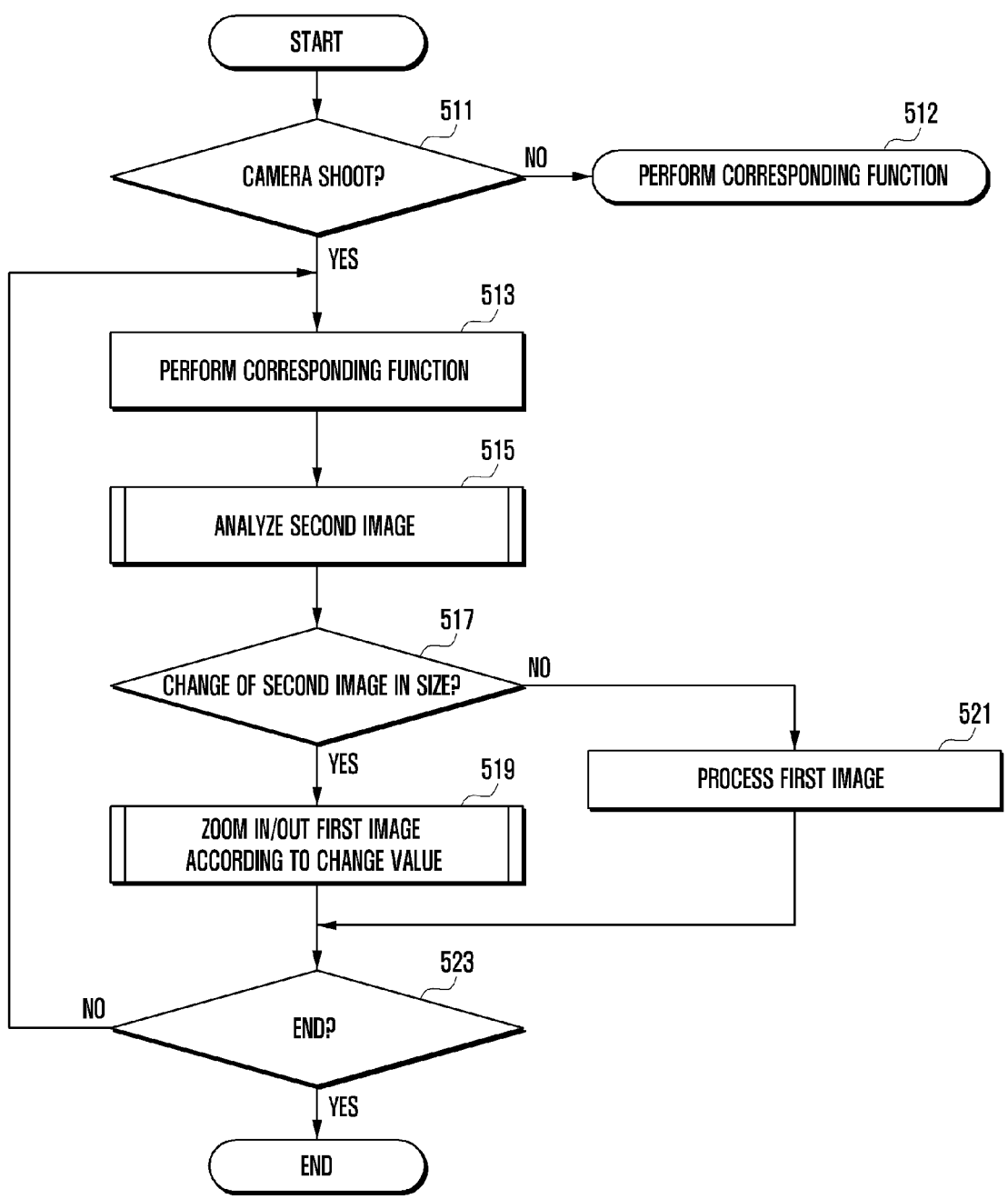
FIG. 5 is a flowchart illustrating an image capturing condition change procedure of the camera depending on the distance between the user and the terminal, according to an embodiment of the present invention.
Figure 6:
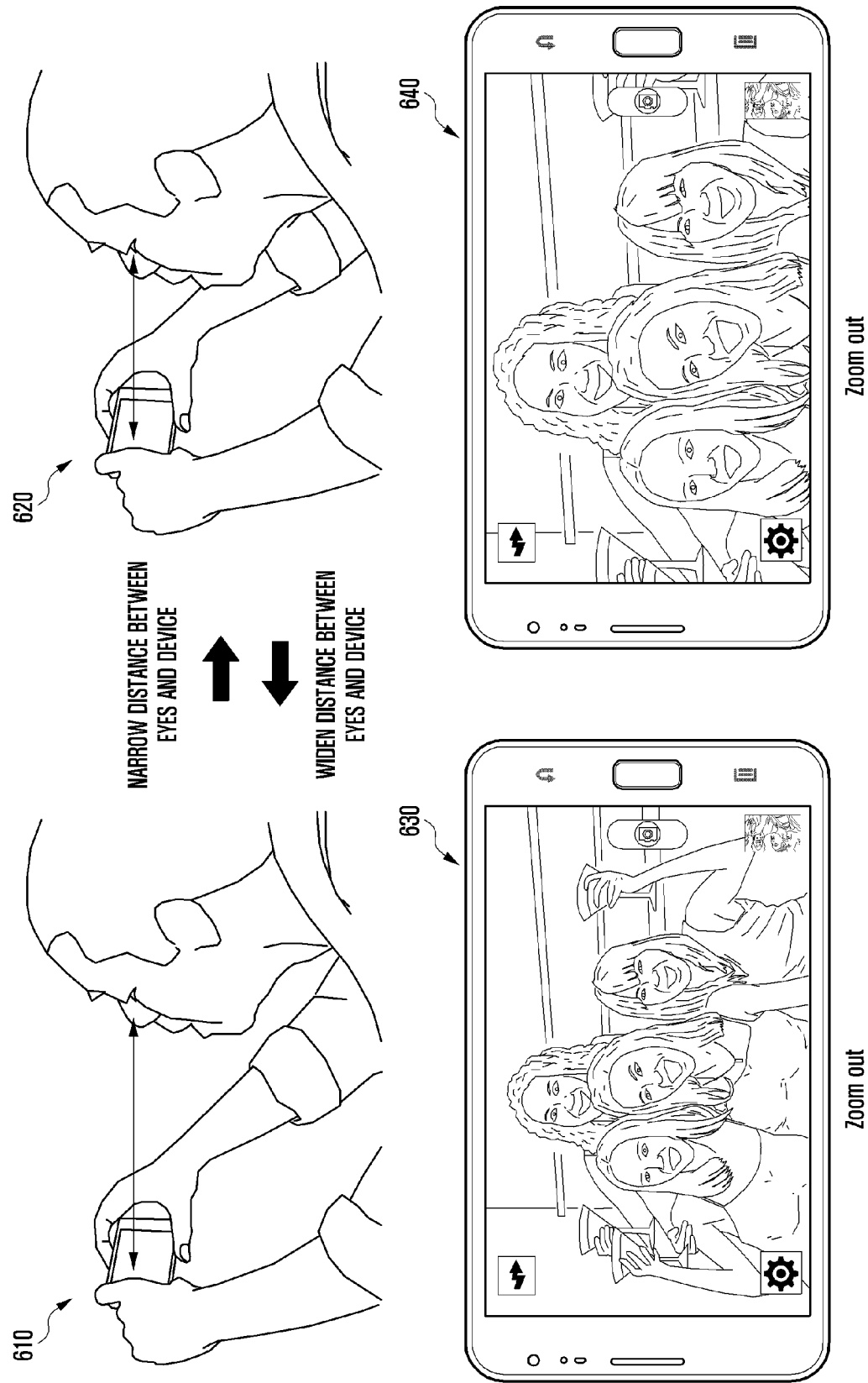
FIG. 6 is a diagram illustrating an operation of the terminal in procedure of FIG. 5, according to an embodiment of the present invention.

FIG. 5 is a flowchart illustrating an image capturing condition change procedure of the camera depending on the distance between the user and the terminal, according to an embodiment of the present invention. FIG. 6 is a diagram illustrating an operation of the terminal in procedure of FIG. 5, according to an embodiment of the present invention.

Referring to FIGS. 5 and 6, it is determined whether the mobile device is in an image capturing mode, in step 511. If the mobile device is not in the image capturing mode, a corresponding function is performed, in step 512. If the mobile device is in the image capturing mode, the control unit 100 acquires and processes the first and second images being captured by the first and second cameras 150 and 160, in step 513. The control unit 100 checks the distance between the mobile terminal and the user by analyzing the second image, in step 515. The distance analysis is performed by comparing a previously shot second image and a currently shot second image, and then comparing the sizes of faces of the images to determine the distance between the terminal and the user. The control unit 100 compares the distance in the previous state and the currently detected distance and determines if there is change in size of the second image, in step 517. If there is no change in the second image, the distance set in the previous state and the image capturing condition (zoom ratio) of the first camera 150 are maintained, and the first image is processed, in step 521. If there is a change in the distance, the control unit 100 controls zoom in/out of the first camera 150 according to the changed distance value, at step 519. Specifically, the control unit 100 may compare the changed distance value to a predefined condition to determine whether zoom in/zoom out is performed.

In step 523, it is determined whether the user ends the image capture operation. When the user ends the image capture operation, the control unit 100 turns off the first and second cameras 150 and 160. If the user does not end the image capture operation, the methodology returns to step 513.

In the image capturing method, according to the above-described embodiment of the present invention, the control unit 100 controls the zoom of the first camera according to the distance between the terminal and the user, as denoted by reference number 610 and 620 of FIG. 6 to generate the first image as denoted by reference number 630 and 640. The control unit 100 analyzes the size of the user's face in the image being shot by the second camera 160 to measure the distance between the terminal and the user. For example, the user sets the zoom of the first camera 150 in the initial image capturing and begins image capturing. Then the control unit 100 measures the size of the user's face in the image being captured by the second camera 160, and stores the user's face size along with the zoom condition of the first camera 150. The face size information may include at least one of the distance between the user's eyes, the distance between the user's nose and eyes, and the size of an entire face line. The control unit 100 is capable of predicting the distance between the terminal and the user according to the change of the user's face size in the image being captured by the second camera 160. The user's face size change may be determined using at least one piece of the face size information.

If the user's face size in the image being captured is smaller than a predetermined face size, the control unit 100 controls the first camera 150 to zoom out according to the size change to acquire the first image. If the user's face size is greater than the predetermined face size, the control unit 100 controls the first camera 150 to zoom in according to the size change to acquire the first image. For example, if the distance between the terminal and the user becomes smaller as denoted by going from reference number 610 to reference number 620, the detected user's face size is relatively large in the image being captured by the second camera 160. The control unit 100 compares the face size measured in the state denoted by reference number 610 and the face size measured in the state denoted by reference number 620, and controls the first camera 150 to zoom in to take the first image, as denoted by reference number 640 at a predetermined ratio according to the difference value. In contrast, if the distance between the terminal and the user becomes wide as denoted by going from reference number 620 to reference number 610, the detected user's face size is relatively small in the image being shot by the second camera 160. The control unit 100 compares the face size measured in the state as denoted by reference number 620 and the face size measured in the state as denoted by reference number 610, and controls the first camera unit 150 to zoom out to take the first image as denoted by reference number 630 at a predetermined ratio according to the difference value.

Figure 7:
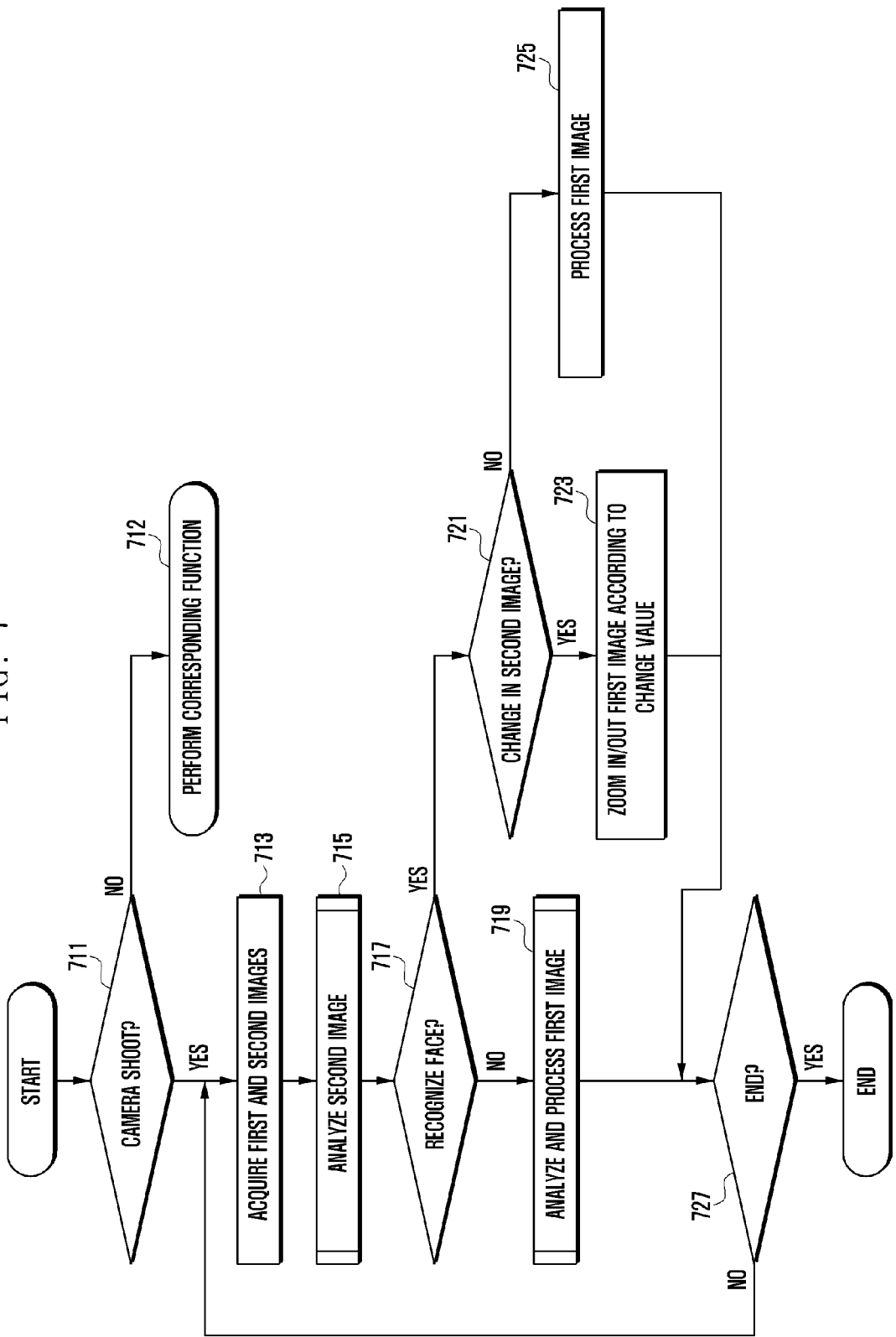
FIG. 7 is a flowchart illustrating the camera image capturing control procedure of the mobile terminal, according to an embodiment of the present invention.

FIG. 7 is a flowchart illustrating the image capturing control procedure of the mobile terminal, according to an embodiment of the present invention. FIG. 7 includes the image capturing control procedure of the embodiment of FIG. 2 and the embodiment of FIG. 5.

Referring to FIG. 7, it is determined whether the mobile terminal is in an image capturing mode, in step 711. If the mobile terminal is not in the image capturing mode, the mobile terminal performs a corresponding function, in step 712. If the terminal is in the image capturing mode, the control unit 100 acquires and processes the first and second images being captured by the first and second cameras 150 and 160, in step 713. The second image is analyzed, in step 715. In step 717, it is determined whether a face is recognized. If a user's face is not recognized or detected in the second image captured by the front camera, the control unit 100 performs the procedure of FIG. 3 at step 719, and analyzes the first image taken by the first camera 150 and/or the output of the sensor 170 to control the first camera's image capturing. If the user's face is recognized or detected at step 717, the control unit 150 determines whether the face size in the second image differs from the user's face size in a previously captured image, in step 721. If there is a change in the second image, the control unit 100 controls the zoom of the first camera 150 at a ratio corresponding to the size change value, in step 723, in order to take the second image. If there is no change in the user's face detected in the second image, the control unit 100 controls the first camera 150 to capture and process the image in the same state as the previous state, in step 725.

In step 727, it is determined whether the user ends the image capture operation. When the user ends the image capture operation, the control unit 100 turns off the first and second cameras 150 and 160. If the user does not end the image capture operation, the methodology returns to step 713.

The image capturing control method of FIG. 2 may be used, when the user intends to capture a motion image with the mobile terminal without shaking significantly while viewing the target directly. When the user intends to control the zoom of the first camera 150 in a still or motion image capturing mode, the image capturing control method of FIG. 5 can be used. When the user and/or the mobile terminal moves while capturing a motion image without paying attention to the image on the screen or viewfinder such that the intended image is no longer in the image capturing area, the mobile terminal of the present invention alerts the user to pay attention to the image. When the distance between the terminal and the user narrows in the still or motion image capturing mode, the control unit 100 controls the first camera 150 to zoom in. When the distance between the terminal and the user widens in the still or motion image capturing mode, the control unit 100 controls the first camera 150 to zoom out.

Embodiments of the present invention relate to an image capturing control apparatus and method of a dual camera-enabled mobile terminal, which is capable of analyzing a user's image capturing state with the front camera to determine whether to adjust an image capturing condition. When the user's image capturing condition changes, the image being captured by the rear camera is checked to alert the user when an unintended image is being captured by the rear camera. If the unintended image is being captured, the mobile terminal determines whether the image capturing condition is adjustable. If the image capturing condition is adjustable, the mobile terminal continues to capture the image while automatically adjusting the image capturing condition. For example, when the user-intended image capturing area is being captured, an embodiment of the present invention makes it possible for the user to capture a scene while seeing the target (physical object) although the user's attention is distracted from the viewfinder or display unit. The user is alerted to reset the image capturing area, resulting in improvement of user convenience in capturing a motion image.

The mobile terminal, according to an embodiment of the present invention, is capable of checking the distance between the user and the mobile terminal by analyzing the user image taken by the front camera, and automatically adjusting the zoom of the image being shot by the rear camera, according to the checked distance. Accordingly, the mobile terminal is capable of checking the distance between the user and the terminal to automatically control zooming in/out based thereon, thereby negating laborious button or lens manipulation for setting the zoom in image capturing mode.

The mobile terminal, according to an embodiment of the present invention, is advantageous in that the front and rear cameras are used simultaneously and images are captured in a more reliable and stable way.

While the invention has been shown and described with reference to certain embodiments thereof, it will be understood by those skilled in the art that various changes in form and detail may be made therein without departing from the spirit and scope of the invention as defined by the appended claims.

What is claimed is:

1. An image capturing apparatus, the apparatus comprising:
a first camera mounted on a rear side of the apparatus configured to capture a first image;
a second camera mounted on a front side of the apparatus configured to capture a second image;
a display unit configured to display the first image; and
a control unit configured to:
drive the first camera and the second camera in an image capturing mode,
detect a user's face in the second image,
buffer the first image as a reference image in response to the user's face being captured by the second camera over a predetermined duration, and
generate an alarm indicating that the first image is out of an intended image capturing area in response to the user's face not being captured by the second camera and in response to a difference being detected between the first image and the reference image,
wherein the reference image is an image corresponding to the intended image capturing area.

2. The apparatus of claim 1, wherein the control unit is configured to generate the alarm in response to the difference between the first image and the reference image being greater than a first predetermined size.

3. The apparatus of claim 2, further comprising a sensor configured to detect motion of the apparatus,
wherein the control unit is configured to:
buffer height and orientation information of the apparatus in response to the user's face being captured by the second camera over the predetermined duration,
compare sensor information on the height and orientation sensed by the sensor with the buffered sensor information in response to the user's face not being captured by the second camera, and
generate the alarm in response to a difference between the sensor information and the buffered sensor information being greater than or equal to a second predetermined size.

4. The apparatus of claim 2, wherein the control unit is configured to:
check whether an image capturing condition of the first camera is adjustable in response to the alarm being generated, and
generate the first image by adjusting the image capturing condition of the first camera in response to the image capturing condition being adjustable.

5. The apparatus of claim 4, wherein the image capturing condition is a zoom condition, and
wherein the control unit is configured to control the first camera to zoom out to include the image capturing area in response to the first camera being in a zoom in state.

6. The apparatus of claim 1, wherein the control unit is configured to:
buffer a user's face size in the second image and a zoom condition of the first image, and
adjust the zoom condition of the second image according a change value of the user's face size, in response the user's face size being changed in the second image.

7. The apparatus of claim 6, wherein the control unit is configured to:
control the first camera to zoom in in response to the user's face size being increased in the second image, and
control the first camera to zoom out in response to the user's face size being decreased in the second image.

8. The apparatus of claim 7, wherein the user's face size comprises at least one of a distance between eyes, a distance between nose and eyes, and a face line.

9. An image capturing control method of a mobile terminal, the method comprising the steps of:
  driving a first camera mounted on a rear side of the mobile terminal, and a second camera mounted on a front side of the mobile terminal;
  detecting a user's face in a second image generated by the second camera;
  buffering a first image generated by the first camera as the reference image, in response to the user's face being captured by the second camera over a predetermined duration; and
  generating an alarm that the first image is out of an intended image capturing area, in response to the user's face not being captured by the second camera and in response to a difference being detected between the first image and a reference image,
  wherein the reference image is an image corresponding to the intended image capturing area.

10. The method of claim 9, wherein generating the alarm comprises:
  generating the alarm in response to the difference between the first image and the reference image being greater than a first predetermined size.

11. The method of claim 10, further comprising:
  buffering height and orientation information of the mobile terminal, in response to the user's face being captured by the second camera over the predetermined duration;
  comparing sensor information on the height and orientation sensed by the sensor with the buffered sensor information, in response to the user's face not being captured by the second camera; and
  generating the alarm in response to a difference between the sensor information and the buffered sensor information being greater than or equal to a second predetermined size.

12. The method of claim 10, further comprising:
  checking whether an image capturing condition of the first camera is adjustable, in response to the alarm being generated; and
  generating the first image by adjusting the image capturing condition of the first camera, in response to the image capturing condition being adjustable.

13. The method of claim 12, wherein the image capturing condition is a zoom condition, and the first camera is controlled to zoom out to include the image capturing area in response to the first camera being in a zoom-in state.

14. The method of claim 9, further comprising:
  buffering a user's face size in the second image and a zoom condition of the first image; and
  adjusting the zoom condition of the second image according to a change value of the user's face size, in response to the user's face size being changed in the second image.

15. The method of claim 14, further comprising controlling the first camera to zoom in in response to the user's face size being increased in the second image, and zoom out in response to the user's face size being decreased in the second image.

16. The method of claim 15, wherein the user's face size comprises at least one of a distance between eyes, a distance between nose and eyes, and a face line.

* * * * *